US010209995B2

(12) United States Patent
Chadha et al.

(10) Patent No.: US 10,209,995 B2
(45) Date of Patent: Feb. 19, 2019

(54) PROCESSOR CORE INCLUDING PRE-ISSUE LOAD-HIT-STORE (LHS) HAZARD PREDICTION TO REDUCE REJECTION OF LOAD INSTRUCTIONS

(71) Applicant: INTERNATIONAL BUSINESS MACHINES CORPORATION, Armonk, NY (US)

(72) Inventors: Sundeep Chadha, Austin, TX (US); Richard James Eickemeyer, Rochester, MN (US); John Barry Griswell, Jr., Austin, TX (US); Dung Quoc Nguyen, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 14/522,811

(22) Filed: Oct. 24, 2014

(65) Prior Publication Data

US 2016/0117173 A1  Apr. 28, 2016

(51) Int. Cl.
*G06F 9/38* (2018.01)

(52) U.S. Cl.
CPC .......... *G06F 9/3838* (2013.01); *G06F 9/3834* (2013.01)

(58) Field of Classification Search
CPC .................................................. G06F 9/3838
USPC ....................................................... 712/206
See application file for complete search history.

(56) References Cited

U.S. PATENT DOCUMENTS

| 6,523,109 | B1 | 2/2003 | Meier |
| 7,809,924 | B2 | 10/2010 | Flood et al. |
| 8,285,947 | B2 | 10/2012 | Beaumont-Smith et al. |
| 9,128,725 | B2* | 9/2015 | Meier ................... G06F 9/3834 |
| 2004/0044881 | A1* | 3/2004 | Maier ................... G06F 9/3824 712/218 |
| 2006/0106987 | A1 | 5/2006 | Barrick et al. |
| 2006/0107021 | A1 | 5/2006 | Barrick et al. |

(Continued)

OTHER PUBLICATIONS

List of IBM Patents or Patent Applications Treated as Related, 1 page.

(Continued)

*Primary Examiner* — Aimee Li
*Assistant Examiner* — Shawn Doman
(74) *Attorney, Agent, or Firm* — Mitch Harris, Atty at Law, LLC; Andrew M. Harris; Grant A. Johnson (57) ABSTRACT

A processor core supporting out-of-order execution (OOE) includes load-hit-store (LHS) hazard prediction at the instruction execution phase, reducing load instruction rejections and queue flushes at the dispatch phase. The instruction dispatch unit (IDU) detects likely LHS hazards by generating entries for pending stores in a LHS detection table. The entries in the table contain an address field (generally the immediate field) of the store instruction and the register number of the store. The IDU compares the address field and register number for each load with entries in the table to determine if a likely LHS hazard exists and if an LHS hazard is detected, the load is dispatched to the issue queue of the load-store unit (LSU) with a tag corresponding to the matching store instruction, causing the LSU to dispatch the load only after the corresponding store has been dispatched for execution.

17 Claims, 6 Drawing Sheets

(56) References Cited

U.S. PATENT DOCUMENTS

| | | | |
|---|---|---|---|
| 2008/0010440 A1* | 1/2008 | Altman | G06F 9/44 |
| | | | 712/225 |
| 2008/0288752 A1 | 11/2008 | Cox et al. | |
| 2009/0157943 A1 | 6/2009 | Robinson | |
| 2010/0262808 A1 | 10/2010 | Bose et al. | |
| 2013/0318330 A1 | 11/2013 | Alexander et al. | |
| 2014/0108770 A1 | 4/2014 | Indukuru et al. | |

OTHER PUBLICATIONS

U.S. Appl. No. 14/724,175, filed May 28, 2015, Chadha, et al.
Office Action in U.S. Appl. No. 14/724,175 dated Nov. 1, 2016, 17 pages (pp. 1-17 in pdf).
Final Office Action in U.S. Appl. No. 14/724,175 dated Feb. 24, 2017, 12 pages (pp. 1-12 in pdf).

\* cited by examiner

| ITAG | RA | RB | IMMED | THREAD | TYPE | VALID |
|------|------|------|-------|--------|------|-------|
| 0001 | 0001 | 0011 | FFE0h | 000 | 000 | 1 |
| 0002 | 0010 | 0100 | FFE0h | 000 | 000 | 0 |
| 0003 | 0010 | 0100 | FFFFh | 000 | 000 | 1 |
| | | | | | | |
| | | | | | | |
| | | | | | | |

# PROCESSOR CORE INCLUDING PRE-ISSUE LOAD-HIT-STORE (LHS) HAZARD PREDICTION TO REDUCE REJECTION OF LOAD INSTRUCTIONS

BACKGROUND OF THE INVENTION

1. Field of the Invention

The present invention is related to processing systems and processors, and more specifically to techniques for predicting load-hit-store hazards at dispatch times to reduce rejection of dispatched load instructions.

2. Description of Related Art

In pipelined processors supporting out-of-order execution (OOE), overlaps between store and load instructions causing load-hit-store hazards represent a serious bottleneck in the data flow between the load store unit (LSU) and the instruction dispatch unit (IDU). In particular, in a typical pipelined processor, when a load-hit-store hazard is detected by the LSU, the load instruction that is dependent on the result of the store instruction is rejected, generally several times, and reissues the load instruction along with flushing all newer instructions following the load instruction. The above-described reject and reissue operation not only consumes resources of the load-store data path(s) within the processor, but can also consume issue queue space in the load-store execution path(s) by filling the load-store issue queue with rejected load instructions that must be reissued. When such an LHS hazard occurs in a program loop, the reject and reissue operation can lead to a dramatic reduction in system performance.

In some systems, the reissued load instruction entries are tagged with dependency flags, so that subsequent reissues will only occur after the store operation on which the load instruction depends, preventing recurrence of the reissue operations. However, rejection of the first issue of the load instruction and the consequent flushing of newer instructions still represents a significant performance penalty in OOE processors.

It would therefore be desirable to provide a processor and a method for managing load-store operations with reduced rejection and reissue of operations, in particular load rejections due to load-hit-store hazards.

BRIEF SUMMARY OF THE INVENTION

The invention is embodied in a processor core, computer system, and method that reduce rejection of load instructions by predicting likely load-hit-store hazards. The method is a method of operation of the processor core and the computer system is a computer system including the processor core.

The processor core is embodied in a processor core supporting out-of-order execution that detects likely load-hit-store hazards. When an instruction dispatch unit decodes a fetched instruction, if the instruction is a store instruction, address information is stored in a load-hit-store detection table. The address information is generally the base registers used to generate the effective address of the store operation in register-based addressing and/or the immediate field of the instruction for immediate addressing. When a subsequent load instruction is encountered, the instruction dispatch unit checks the load-hit-store detection table to determine whether or not an entry in the table has matching address information. If a matching entry exists in the table, the instruction dispatch unit forwards the load instruction with a tag corresponding to the entry, so that the load-store unit will execute the load instruction after the corresponding store has been executed. If no matching entry exists in the table, the load instruction is issued untagged.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and processing systems in which rejects of load instructions due to load-hit-store (LHS) hazards is reduced by predicting the occurrence of such hazards using a LHS prediction table to track dispatched stores that may or may not have been issued/executed. Load instructions are examined at dispatch time to determine whether or not a pending store exists that has not been committed for a cache write or that has otherwise been flushed from the load-store execution path. If an LHS hazard is detected, the load instruction is dispatched with an ITAG matching the ITAG of the store instruction corresponding to the entry in the LHS prediction table, so that the load-store unit will issue the load instruction dependent on the store result, i.e., will retain the load instruction in its issue queue until the store instruction is committed or flushed, preventing rejections of load instructions due to identification of LHS hazards during issue of the load instructions.

Figure 1:
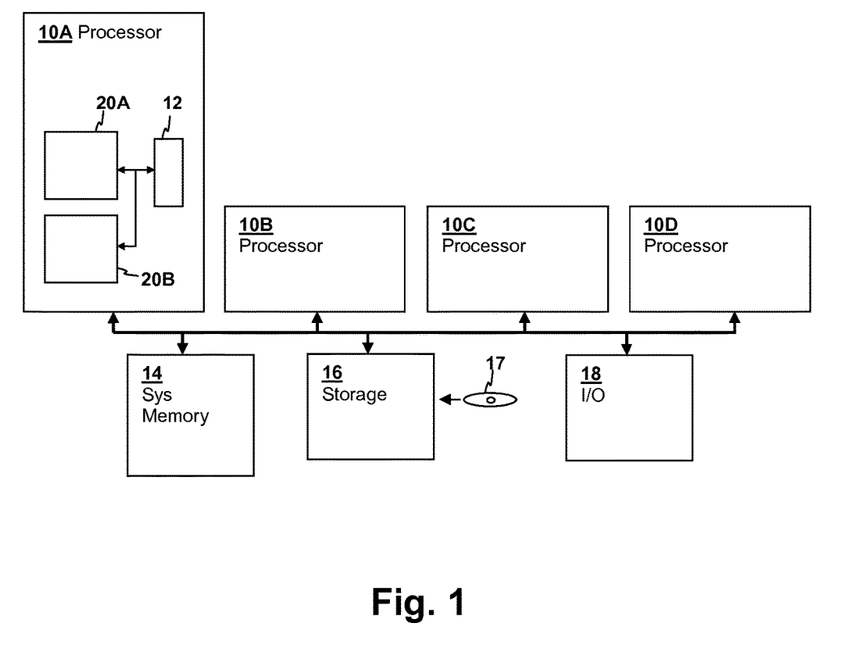
FIG. 1 is a block diagram illustrating a processing system in accordance with an embodiment of the present invention.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and a processing system in accordance with other embodiments of the present invention includes uni-processor systems having symmetric multi-threading (SMT) cores. Processors 10A-10D are identical in structure and include cores 20A-20B and a local storage 12, which may be a cache level, or a level of internal system memory. Processors 10A-10B are coupled to a main system memory 14, a storage subsystem 16, which includes non-removable drives and optical drives, for reading media such as a CD-ROM 17. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
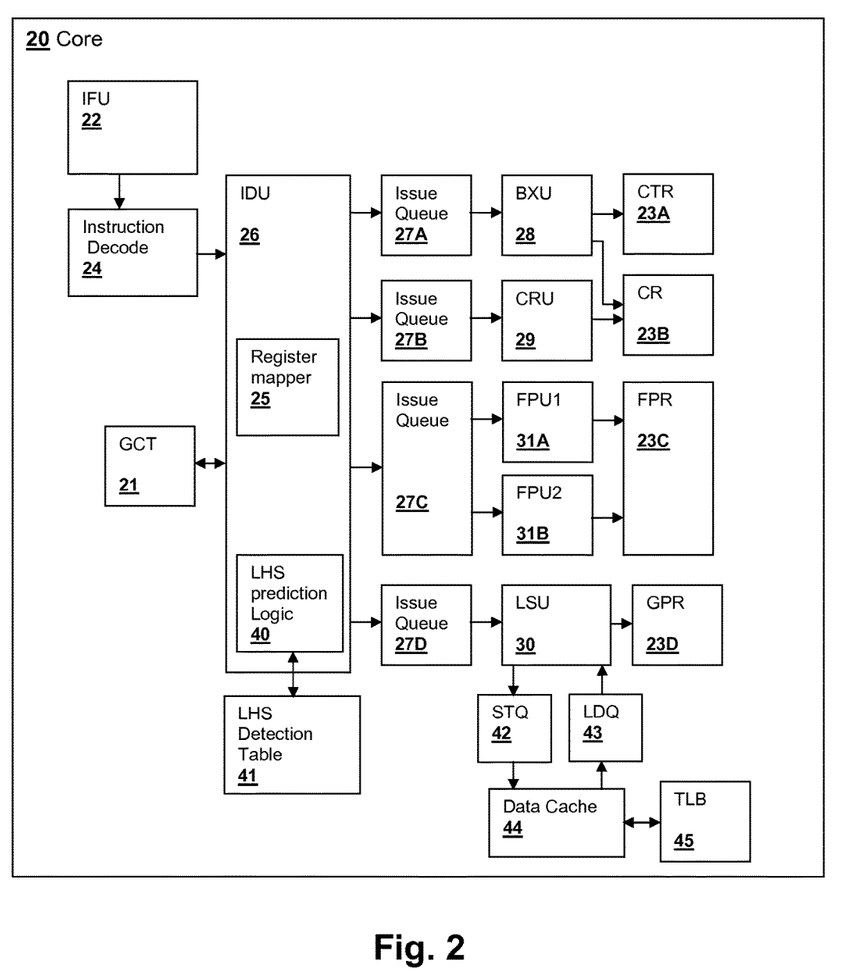
FIG. 2 is a block diagram illustrating details of a processor core 20 in accordance with an embodiment of the present invention.

Referring now to FIG. 2, details of processor cores 20A-20B of FIG. 1 are illustrated in depicted processor core 20. Processor core 20 includes an instruction fetch unit (IFU) 22 that fetches one or more instruction streams from cache or system memory and presents the instruction stream(s) to an instruction decode unit 24. An instruction dispatch unit (IDU) 26 dispatches the decoded instructions to a number of internal processor pipelines. The processor pipelines each include one of issue queues 27A-27D and an execution unit provided by branch execution unit (BXU) 28, condition result unit (CRU) 29, load-store unit (LSU) 30 or floating point units (FPUs) 31A-31B. Registers such as a counter register (CTR) 23A, a condition register (CR) 23B, general-purpose registers (GPR) 23D, and floating-point result registers (FPR) 23C provide locations for results of operations performed by the corresponding execution unit(s). A global completion table (GCT) 21 provides an indication of pending operations that is marked as completed when the results of an instruction are transferred to the corresponding one of result registers 23A-23D. In embodiments of the present invention, a LHS prediction logic 40 within IDU 26 manages a LHS detection table 41 that contains entries for all pending store operations, e.g., all store operations that have not reached the point of irrevocable execution. IDU 26 also manages register mapping via a register mapper 25 that allocates storage in the various register sets so that concurrent execution of program code can be supported by the various pipelines. LSU 30 is coupled to a store queue (STQ) 42 and a load queue (LDQ) 43, in which pending store and load operations are respectively queued for storages within a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space.

Figure 3:
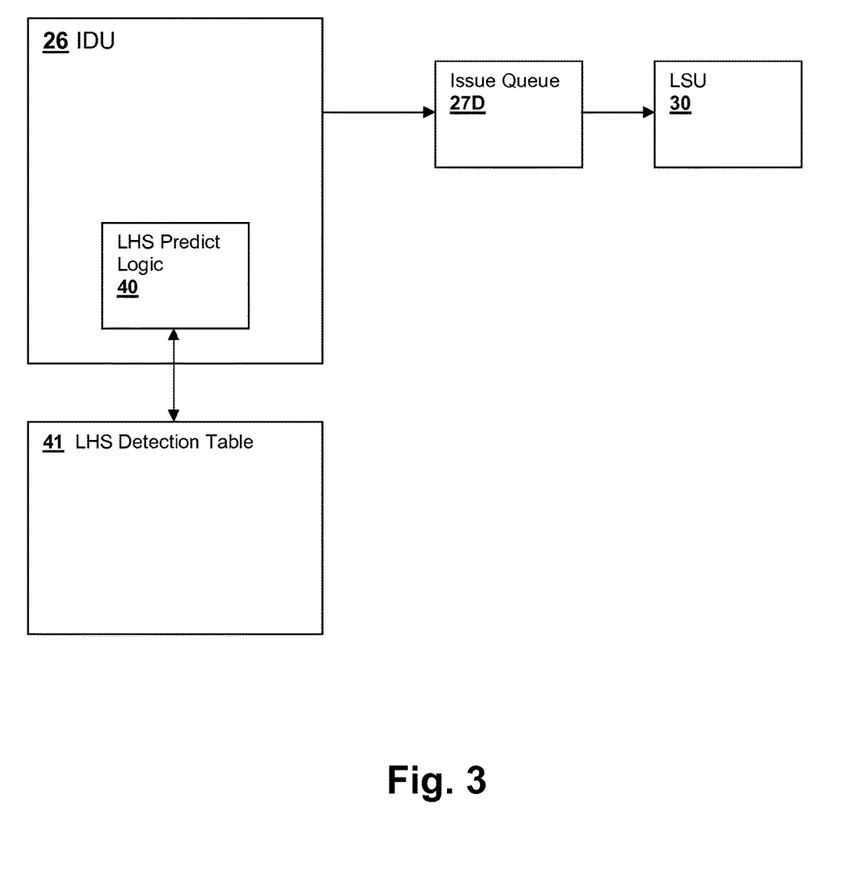
FIG. 3 is a block diagram illustrating details within processor core 20 of FIG. 2 in accordance with an embodiment of the present invention.
Figure 4:
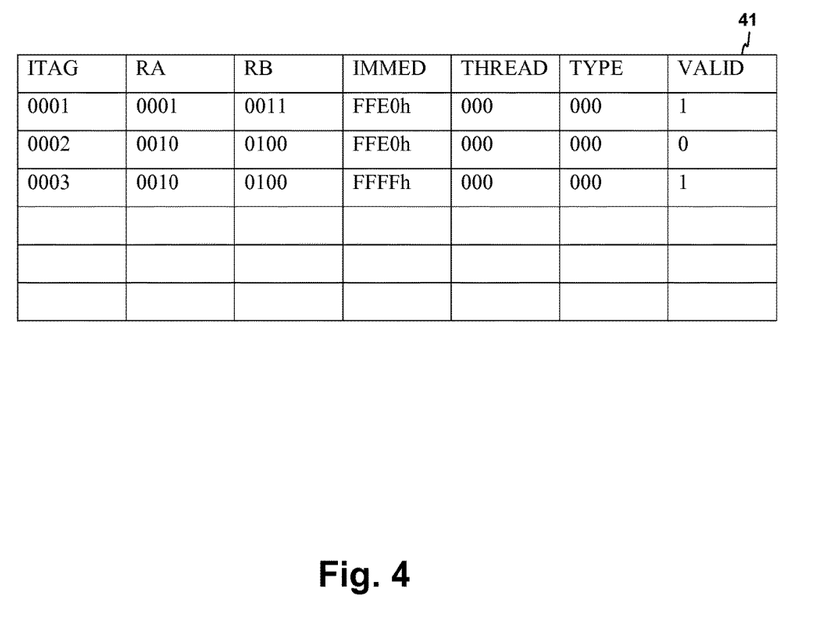
FIG. 4 is a table depicting entries within LHS detection table 41 of processor core 20 in accordance with an embodiment of the present invention.

Referring now to FIG. 3, a block diagram illustrating details of IDU 26 within processor core 20 of FIG. 2 is shown. LHS prediction logic 40 provides tracking of pending store operations by generating entries for each store instruction decoded by instruction decode unit 24 in LHS detection table 41. When store instructions are received by IDU 26, address information associated with the store instruction, which in the particular embodiment are the base registers and/or the immediate value used in calculating the effective address (EA) of the store operation, is inserted in LHS detection table 41. The entry is also populated with an instruction tag (ITAG) identifying the particular store instruction, so that the entry in LHS detection table 41 can be invalidated when the particular store instruction completes, along with other information such as the thread identifier for the instruction, the valid bit and the store instruction type, which is used to determine which field(s) to compare for address matching. FIG. 4 shows an exemplary LHS detection table 41 containing two valid entries and one entry that has been retired due to completion/commit of the store instruction to data cache 44 or invalidated due to a flush. When IDU 26 receives a load instruction, LHS prediction logic compares the address information (e.g., immediate field and/or base registers, depending on the type of addressing) of the load instruction with each entry in LHS detection table 41, which may be facilitated by implementing LHS detection table 41 with a content-addressable memory (CAM) that produces the ITAG of the LHS detection table entry given the address information, thread identifier and store instruction type for valid entries. LHS detection table 41 may alternatively be organized as a first-in-first-out (FIFO) queue. The load instruction is then dispatched to issue queue 27D with the ITAG of the entry, in order to cause LSU 30 to retain the load instruction in issue queue 27D until the store instruction causing the LHS hazard in conjunction with the load instruction has issued, completed, or has been otherwise irrevocably committed or flushed. In one embodiment of the invention, the lookup in LHS detection table 41 locates the most recent entry matching the look-up information, so that if multiple matching entries exist in LHS detection table 41, the load instruction will be queued until the last store instruction causing an LHS hazard has been issued/completed/committed/flushed. In another embodiment, before an entry is generated in LHS detection table 41, a look-up is performed to determine if a matching entry exists, and if so, the existing entry is invalidated or updated with a new ITAG. If LHS detection table 41 is full, the oldest entry is overwritten.

It should be noted that the above-described matching does not generally detect all LHS hazards, since, for example, a store instruction using immediate addressing may hit the same address as a load instruction using register or register indirect addressing, and a matching entry in LHS detection table 41 will not be found for the load. Such an LHS hazard will instead be rejected during the issue phase after the full EA has been computed for both the load and store instructions. However, most likely LHS hazards should be detected under normal circumstances and the number of load rejects due to LHS hazards dramatically reduced. Further, an entry may be found in LHS detection table 41 that is flagged as an LHS hazard and in actuality is not, for example, when a base register value has been modified between a register-addressed load and a preceding register-addressed store using the same base register pair. Therefore, the method detects likely LHS hazards and not guaranteed address conflicts/overlaps. However, such occurrences should be rare compared to the number of actual LHS hazards detected.

Figure 5:
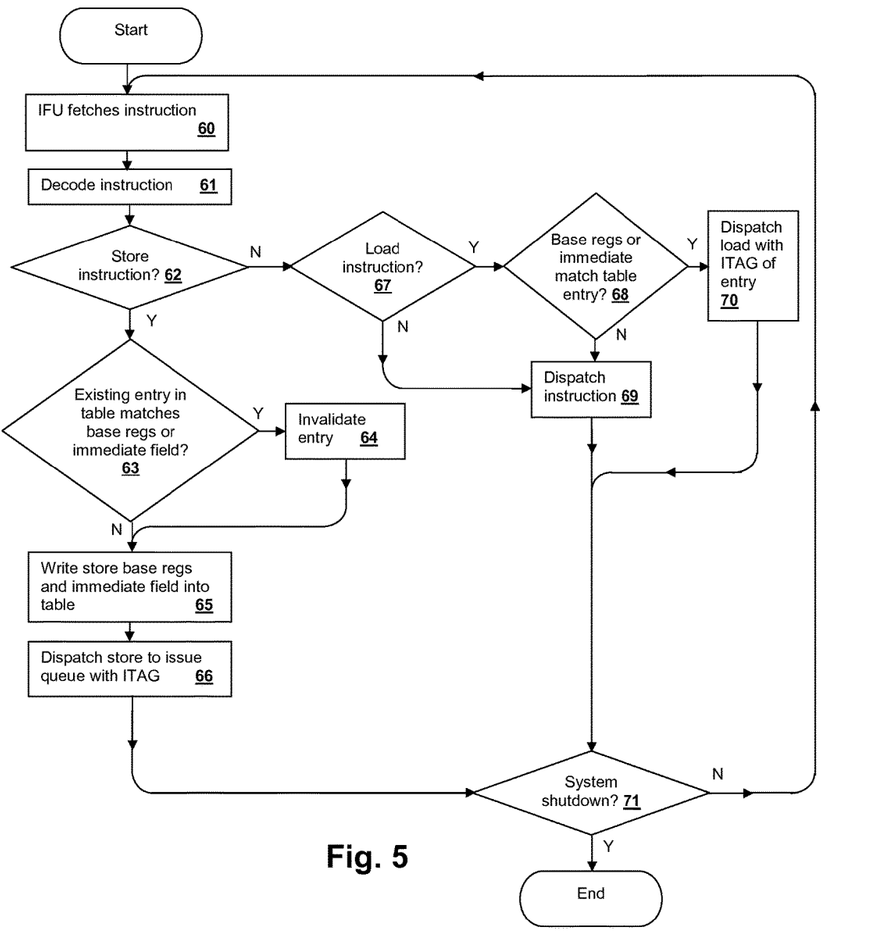
FIG. 5 is a flowchart depicting a method of dispatching load/store instructions in accordance with an embodiment of the present invention.

Referring now to FIG. 5, a method of operation of processor core 20 in accordance with an embodiment of the present invention, is illustrated in a flowchart. As illustrated in FIG. 5, when an IFU fetches instruction (step 60) and the instruction is decoded (step 61), if the instruction is a store instruction (decision 62), and if there is an existing entry in LHS detection table 41 that matches the base registers (register-based addressing) and/or immediate field (immediate addressing) of the store instruction (decision 63), the existing entry is invalidated, or alternatively over-written (step 64). The base registers and immediate field of the store instruction are written to an entry in LHS detection table 41 (step 65) and the store instruction is dispatched (step 66). If the instruction is not a store instruction (decision 62), but is a load instruction (decision 67), if the base registers (register-based addressing) or immediate field (immediate addressing) match an entry in LHS detection table 41 (decision 68), the load instruction is dispatched to issue queue 27D with an ITAG of the store instruction corresponding to the table entry (step 70). Otherwise, the load instruction is dispatched without an ITAG (step 69), as are instructions that neither load nor store instructions. Until the system is shut down (decision 71), steps 60-70 are repeated.

Figure 6:
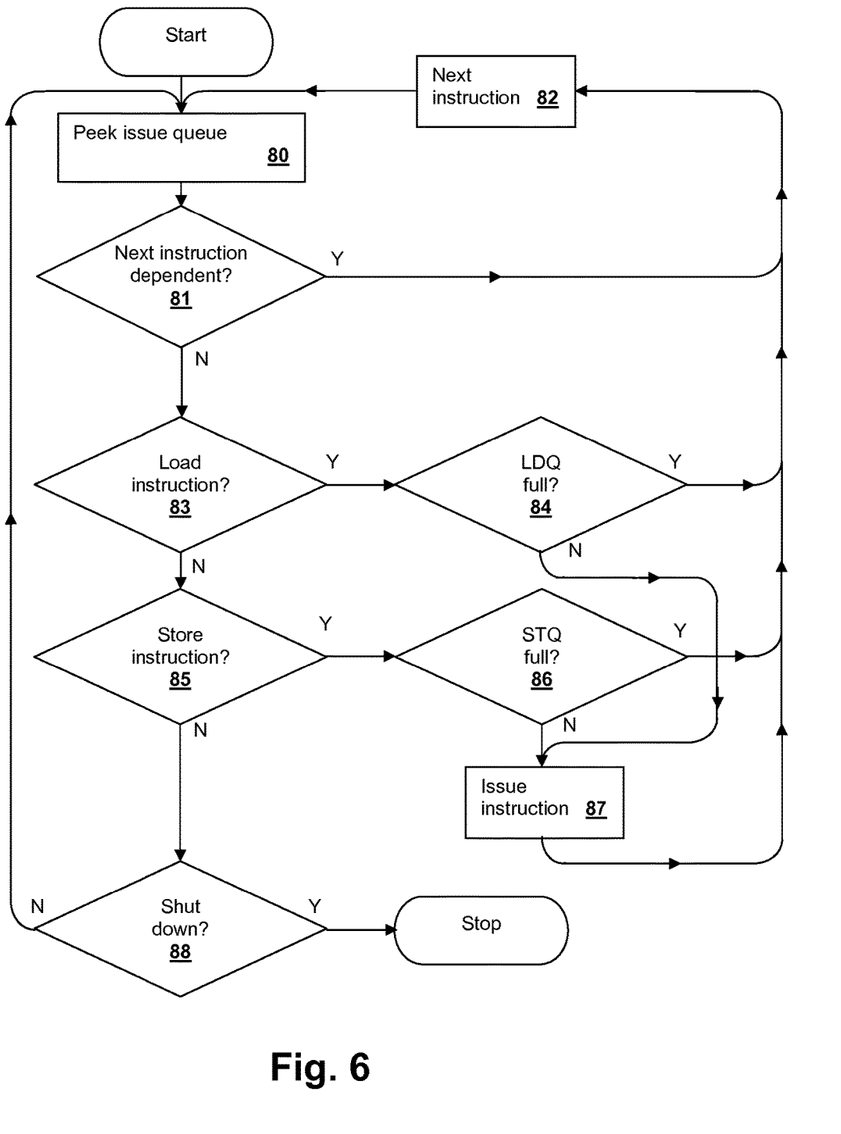
FIG. 6 is a flowchart depicting a method of issuing load/store instructions in accordance with an embodiment of the present invention.

Referring now to FIG. 6, another method of operation of processor core 20 in accordance with an embodiment of the present invention is illustrated in a flowchart. As illustrated in FIG. 6, LSU 30 peeks issue queue 27D (step 80) and if the next instruction has an existing dependency (decision 81), such as a dependency generated by the method of FIG. 5 when the load instruction is dispatched with an ITAG of a store for which an LHS hazard is predicted, the peek moves to the next instruction (step 82). If the next instruction does not have an existing dependency (decision 81), if the instruction is a load instruction (decision 83), and LDQ 43 is not full (decision 84), the load instruction is issued to LDQ 43 (step 87). Similarly, if the instruction is a store instruction (decision 85), and STQ 42 is not full (decision 86), the store instruction is issued to STQ 86 (step 87). Until the system is shut down (decision 88), steps 80-87 are repeated.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processor core, comprising:
one or more hardware facilities including execution units for executing instructions, including a load-store unit for loading and storing data values operated on by the instructions, wherein the instructions include load instructions and store instructions of an instruction stream;
an instruction fetch unit for fetching the instructions;
an instruction dispatch unit for dispatching the instructions to issue queues corresponding to the execution units according to a type of the instructions, wherein the instruction dispatch unit includes control logic that detects each store instruction of the instruction stream during dispatching of the instructions, wherein the store instructions are instructions that write store values to locations specified by corresponding store addresses, and wherein the instruction dispatch unit, for each detected store instruction stores store address information associated with each detected store instruction by generating a corresponding new entry containing the associated store address information, a type value indicating a type of addressing used for a corresponding one of the store instructions, a thread number of the corresponding one of the store instructions and an itag identifying the corresponding one of the store instructions in a load-hit-store detection table internal to the processor core and further dispatches each detected store instruction to one of the issue queues, wherein the load-hit-store detection table is a storage separate from the issue queues, wherein the control logic, further responsive to detecting each store instruction and as the detected store instruction is being dispatched, first compares address information associated with the detected store instruction with entries in the load-hit-store detection table to determine whether or not a first matching entry exists matching the address information associated with the detected store instruction, wherein the control logic, responsive to determining that the first matching entry exists, invalidates the first matching entry, wherein the control logic further includes control logic that detects each load instruction of the instruction stream during the dispatching of the instructions and, responsive to detecting each load instruction and prior to dispatch of the load instruction, second compares store address information of entries in the load-hit-store detection table with load address information of each load instruction to determine whether or not a second matching entry in the load-hit-store detection table indicates that the load instruction is a likely load-hit-store hazard, whereby each load instruction detected by the control logic is matched against entries in the load-hit-store detection table to determine whether or not the detected load instruction is a likely load-hit-store hazard, wherein the control logic matches the entries by matching one or more selected fields of the store address information stored within the entries by selecting the selected fields according to the stored type value of the entries and wherein the control logic, responsive to determining that the load instruction is a likely load-hit-store hazard, identifies the load instruction determined to be a likely load-hit-store hazard to the load-store unit by forwarding the itag stored in the second matching entry in the load-hit-store detection table to the load-store unit along with the load instruction.

2. The processor core of claim 1, wherein the control logic, responsive to determining that the detected load instruction is not a likely load-hit-store hazard, dispatches the detected load instruction to the one of the issue queues without a corresponding itag.

3. The processor core of claim 2, wherein the store address information stored in the new entry in the load-hit-store detection table is one or both of an immediate field of the corresponding one of the store instructions and one or more base register numbers of the corresponding one of the store instructions.

4. The processor core of claim 2, wherein the load-store unit examines a next entry of the one of the issue queues to determine whether or not a next instruction is a next load instruction having a corresponding itag, and wherein the load-store unit, responsive to determining that the next instruction is not the next load instruction having a corresponding itag, processes the next entry for execution by the load-store unit, wherein the load-store unit examines the next entry of the one of the issue queues to determine whether or not the next instruction is a next store instruction, wherein the load-store unit, responsive to determining that the next instruction is the next store instruction, examines the next entry of the one of the issue queues to determine whether a second load instruction having a corresponding itag matching an itag of the next store instruction is present, wherein the load-store unit, responsive to determining that the next instruction is the next store instruction, processes the next store instruction for execution by the load-store unit, and wherein the load-store unit, responsive to determining that the second load instruction having a corresponding itag matching the itag of the next store instruction is present, processes the second load instruction for execution by the load-store unit subsequent to processing the next store instruction.

5. A processing system, comprising:
a memory for storing program instructions and data values; and
a processor coupled to the memory for executing the program instructions to operate on the data values, wherein the processor comprises one or more hardware facilities including execution units for executing the program instructions including a load-store unit for loading and storing the data values operated on by the program instructions, wherein the program instructions include load instructions and store instructions of an instruction stream, an instruction fetch unit for fetching the program instructions, an instruction dispatch unit for dispatching the program instructions to issue queues corresponding to the execution units according to a type of the instructions, wherein the instruction dispatch unit includes control logic that detects each store instruction of the instruction stream during dispatching of the instructions, wherein the store instructions are instructions that write store values to locations specified by corresponding store addresses, and wherein the instruction dispatch unit, for each detected store instruction stores store address information associated with each detected store instruction by generating a corresponding new entry containing the associated store address information, a type value indicating a type of addressing used for a corresponding one of the store instructions, a thread number of the corresponding one of the store instructions and an itag identifying the corresponding one of the store instructions in a load-hit-store detection table internal to the processor core and further dispatches each detected store instruction to one of the issue queues, wherein the load-hit-store detection table is a storage separate from the issue queues, wherein the control logic, further responsive to detecting each store instruction and as the detected store instruction is being dispatched, first compares address information associated with the detected store instruction with entries in the load-hit-store detection table to determine whether or not a first matching entry exists matching the address information associated with the detected store instruction, wherein the control logic, responsive to determining that the first matching entry exists, invalidates the first matching entry, wherein the control logic further includes control logic that detects each load instruction of the instruction stream during the dispatching of the instructions and, responsive to detecting each load instruction and prior to dispatch of the load instruction, second compares store address information of entries in the load-hit-store detection table with load address information of each load instruction to determine whether or not a second matching entry in the load-hit-store detection table indicates that the load instruction is a likely load-hit-store hazard, whereby each load instruction detected by the control logic is matched against entries in the load-hit-store detection table to determine whether or not the detected load instruction is a likely load-hit-store hazard, wherein the control logic matches the entries by matching one or more selected fields of the store address information stored within the entries by selecting the selected fields according to the stored type value of the entries and wherein the control logic, responsive to determining that the load instruction is a likely load-hit-store hazard, identifies the load instruction determined to be a likely load-hit-store hazard to the load-store unit by forwarding the itag stored in the second matching entry in the load-hit-store detection table to the load-store unit along with the load instruction.

6. The processing system of claim 5, wherein the control logic, responsive to determining that the detected load instruction is not a likely load-hit-store hazard, dispatches the detected load instruction to the one of the issue queues without a corresponding itag.

7. The processing system of claim 6, wherein the load-store unit examines a next entry of the one of the issue queues to determine whether or not a next instruction is a next load instruction having a corresponding itag, and wherein the load-store unit, responsive to determining that the next instruction is not the next load instruction having a corresponding itag, processes the next entry for execution by the load-store unit, wherein the load-store unit examines the next entry of the one of the issue queues to determine whether or not the next instruction is a next store instruction, wherein the load-store unit, responsive to determining that the next instruction is the next store instruction, examines the next entry of the one of the issue queues to determine whether a second load instruction having a corresponding itag matching an itag of the next store instruction is present, wherein the load-store unit, responsive to determining that the next instruction is the next store instruction, processes the next store instruction for execution by the load-store unit, and wherein the load-store unit, responsive to determining that the second load instruction having a corresponding itag matching the itag of the next store instruction is present, processes the second load instruction for execution by the load-store unit subsequent to processing the next store instruction.

8. The processor core of claim 1, wherein the store address information stored in the load-hit-store detection table is one or both of an immediate field of the detected store instruction and one or more base register numbers of the detected store instruction.

9. The processing system of claim 5, wherein the store address information stored in the load-hit-store detection table is one or both of an immediate field of the detected store instruction and one or more base register numbers of the detected store instruction.

10. A method of operation of a processor core, the method comprising:
fetching instructions of an instruction stream wherein the instructions include load instructions and store instructions;
dispatching the instructions of the instruction stream by an instruction dispatch unit of the processor core that dispatches the instructions to issue queues, according to a type of the instructions;
the instruction dispatch unit detecting each store instruction and each load instruction of the instruction stream during the dispatching of the instructions, wherein the store instructions are instructions that write store values to locations specified by corresponding store addresses;
responsive to the instruction dispatch unit detecting each store instruction, wherein the store instructions are instructions that write store values to locations specified by corresponding store addresses, storing the corresponding store address information associated with each detected store instruction by generating a corresponding new entry containing the associated store address information, a type value indicating a type of addressing used for a corresponding one of the store instructions, a thread number of the corresponding one of the store instructions and an itag identifying the corresponding one of the store instructions in a load-hit-store detection table internal to the processor core and separate from issue queues, and dispatching each detected store instruction to one of the issue queues;

responsive to the instruction dispatch unit detecting each store instruction, first comparing address information associated with the detected store instruction with entries in a load-hit-store detection table to determine whether or not a first matching entry exists matching the address information associated with the detected store instruction;

responsive to determining that a first matching entry exists, invalidating the first matching entry;

responsive to the instruction dispatch unit detecting each load instruction and prior to dispatch of the detected load instruction, second comparing store address information of entries in the load-hit-store detection table with load address information of the detected load instruction to determine whether or not a second matching entry in the load-hit-store detection table indicates that the detected load instruction is a likely load-hit-store hazard, whereby each load instruction detected by the control logic is matched against entries in the load-hit-store detection table to determine whether or not the detected load instruction is a likely load-hit-store hazard, wherein the control logic matches the entries by matching one or more selected fields of the store address information stored within the entries by selecting the selected fields according to the stored type value of the entries;

responsive to determining that the detected the load instruction is a likely load-hit-store hazard, identifying the load instruction determined to be a likely load-hit-store hazard to the load-store unit by forwarding the itag stored in the second matching entry in the load-hit-store detection table to the load-store unit along with the load instruction; and repeating the first comparing, the invalidating, the first storing, the second storing, the matching and the second comparing to detect other likely load-hit-store hazards.

11. The method of claim 10, wherein the identifying further comprises:

responsive to the second comparing determining that the detected load instruction is not a likely load-hit-store hazard, dispatching the detected load instruction to the one of the issue queues without a corresponding itag.

12. The method of claim 11, wherein the store address information stored in the new entry in the load-hit-store detection table is one or both of an immediate field of the corresponding one of the store instructions and one or more base register numbers of the corresponding one of the store instructions.

13. The method of claim 11, further comprising:

the load-store unit examining a next entry of the one of the issue queues to determine whether or not a next instruction is a next load instruction having a corresponding itag;

the load-store unit, responsive to determining that the next instruction is not the next load instruction having a corresponding itag, processing the next entry for execution by the load-store unit;

the load-store unit examining the next entry of the one of the issue queues to determine whether or not the next instruction is a next store instruction;

the load-store unit, responsive to determining that the next instruction is the next store instruction, examining the next entry of the one of the issue queues to determine whether a second load instruction having a corresponding itag matching an itag of the next store instruction is present;

the load-store unit, responsive to determining that the next instruction operation is the next store instruction, processing the next store instruction for execution by the load-store unit; and the load-store unit, responsive to determining that the second load instruction having a corresponding itag matching the itag of the next store instruction is present, processing the second load instruction for execution by the load-store unit subsequent to processing the next store instruction.

14. The method of claim 10, wherein the store address information stored in the load-hit-store detection table is one or both of an immediate field of the detected store instruction and one or more base register numbers of the detected store instructions.

15. The method of claim 10, wherein the load-hit-store detection table includes a content-addressable memory storing itags of entries in the load-hit-store detection table, and wherein the forwarding the itag is performed by retrieving the itag by supplying the address of the detected load instruction to the content-addressable memory.

16. The processor core of claim 1, wherein the load-hit-store detection table includes a content-addressable memory storing itags of entries in the load-hit-store detection table, and wherein the control logic forwards the itag by retrieving the itag by supplying the address of the detected load instruction to the content-addressable memory.

17. The processing system of claim 5, wherein the load-hit-store detection table includes a content-addressable memory storing itags of entries in the load-hit-store detection table, and wherein the control logic forwards the itag by retrieving the itag by supplying the address of the detected load instruction to the content-addressable memory.

* * * * *